No. 757,233. PATENTED APR. 12, 1904.
P. V. SCHANDONEY.
DRAFT EQUALIZER.
APPLICATION FILED DEC. 12, 1903.
NO MODEL.
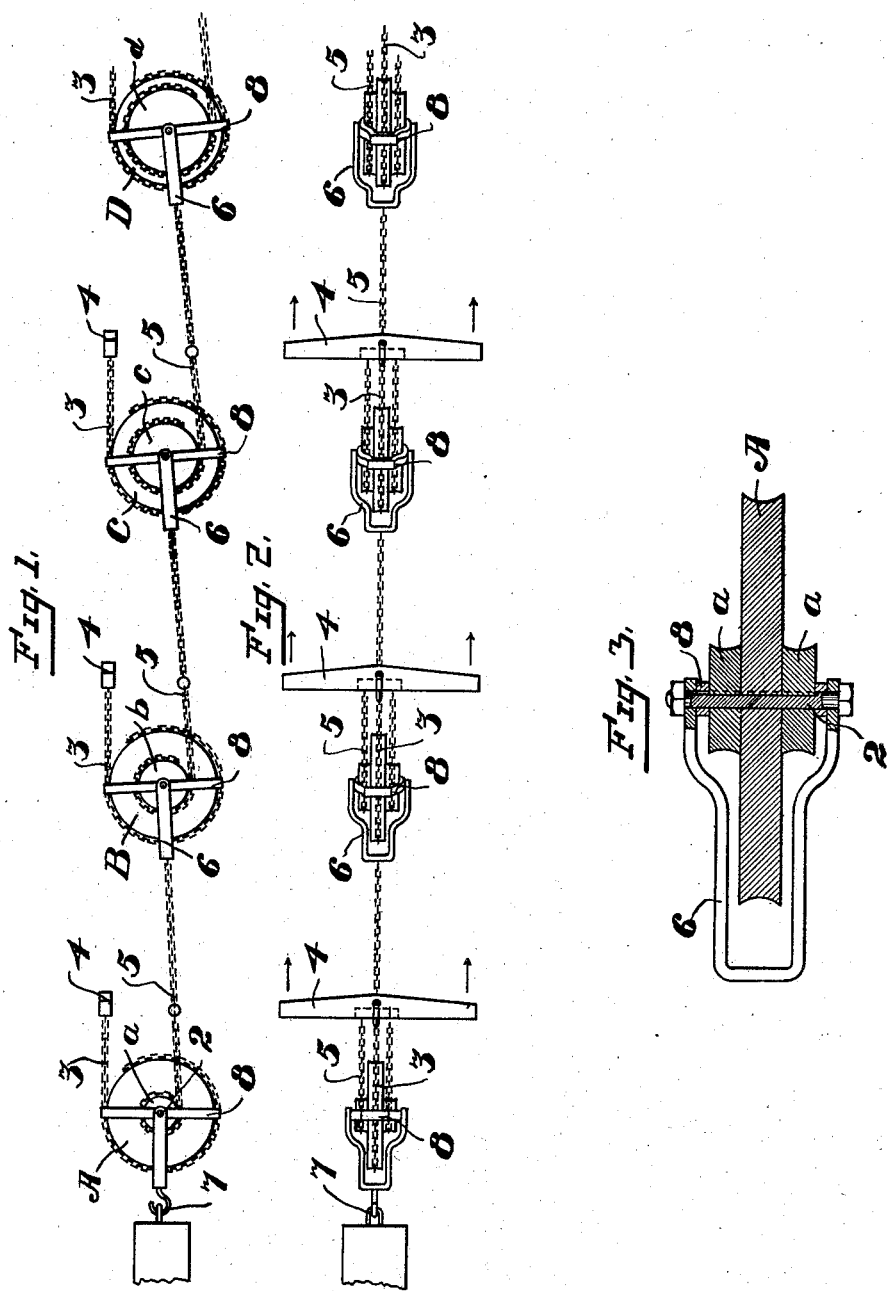
Witnesses,
Inventor,
Peter V. Schandoney
By Geo. H. Strong
Atty.

No. 757,233. Patented April 12, 1904.

UNITED STATES PATENT OFFICE.

PETER V. SCHANDONEY, OF SACRAMENTO, CALIFORNIA.

DRAFT-EQUALIZER.

SPECIFICATION forming part of Letters Patent No. 757,233, dated April 12, 1904.

Application filed December 12, 1903. Serial No. 184,925. (No model.)

*To all whom it may concern:*

Be it known that I, PETER V. SCHANDONEY, a citizen of the United States, residing at Sacramento, in the county of Sacramento and State of California, have invented new and useful Improvements in Draft-Equalizers, of which the following is a specification.

My invention relates to an improved system of draft-equalization employing pulleys and interconnecting draft-chains. Its object is to render the pulley type of draft-equalizer practical, so that the natural inequalities in the length of the sections of chain passing around a pulley or drum will not react upon the animals on the shorter section to make them haul an undue proportion of the load.

It consists of the parts and the construction and combination of parts, as hereinafter more fully described, having reference to the accompanying drawings, in which—

Figure 1 is a side elevation of my equalizer. Fig. 2 is a plan of same. Fig. 3 is an enlarged central section of set of equalizing-pulleys.

A B C D represent a series of successively-arranged draft-equalizer pulleys or drums, and $a\ b\ c\ d$ are respective smaller pulleys or drums removably associated and coaxial with the drums A B C D. Each pair of drums A $a$, B $b$, &c., are adapted to be locked together and to turn in unison upon the same spindle or pin 2. Each of the larger drums has a chain, as 3, secured at one end permanently to its periphery and wrapped once or more times around the drum, the outer end of the chain being connected with a draft-bar, as 4, to which one or more animals may be attached. Each of the smaller drums likewise has a chain 5 secured fixedly at one end to its periphery and passing once or more times around it, but in an opposite direction to chains 3, since the tugs on the two sets of chains are to offset one another. The free end of each chain 5 connects with the bail-strap 6 of the block immediately in advance. The rearmost block A $a$ connects to the vehicle, as at 7. As an interconnecting chain 5 winds up or pays out the corresponding chain 3 is relatively lengthened or shortened. There may be as many of these blocks coupled up in the manner described as desired, according to the size of the team, which latter may comprise from four or six to thirty or more horses. In the present instance I have shown a span attached to each of the doubletrees 4. Accordingly those animals attached to tree 4 on drum A would pull against the six in advance and the two on drum B would pull against the four in advance of them, and so on. Consequently the different leverages for these several pairs to enable them to pull their proportion of the load are provided by varying the sizes of the several smaller drums $a\ b\ c\ d$ relative to their respective larger drums A B C D. As the drums and the sections of the several chains stand in normal working position in a vertical plane, there is no danger of the animals becoming entangled in the gear. By this construction considerable latitude is given for the forward and backward action of the several portions of the team. Thus with a six-inch pulley, as $a$, one wrap of the chain would give approximately an eighteen-inch play for the animals in front. With all this advantage of forward and back action over the systems using straight levers there is an entire absence of the binding effect of a chain passing around a single pulley and having its ends connected to different sections of the team.

The pins 2 are removable to permit of a change of pulleys $a\ b$, &c., to suit the strength of one group of animals to that of the rest of the team. The pins may be grooved and the several pulleys correspondingly feathered to lock the several pairs of pulleys A $a$, B $b$, &c., or any other suitable means may be furnished to connect them rigidly.

A simple means of retaining the several chains upon their pulleys is provided by the supplementary straps 8, rigid and movable with the bail-straps 6.

Having thus described my invention, what I claim, and desire to secure by Letters Patent, is—

In a draft-equalizer, a series of successively-arranged blocks, each block comprising a larger pulley and two smaller pulleys coaxial and rigidly interlocked with the larger pulley, the smaller pulleys gradually increasing in diameter relative to their respective large pulleys away from the load or rear end of the series, chains secured to the several pulleys and wrapped a portion of a turn thereon, draft-bars connected with the chains on the larger pulleys and the chains on the smaller pulleys except at the forward end of the series connecting with the block in advance.

In testimony whereof I have hereunto set my hand in presence of two subscribing witnesses.

PETER V. SCHANDONEY.

Witnesses:
JOE LAWRENCE,
F. L. HAM.